US011818042B2

(12) United States Patent
Nagre et al.

(10) Patent No.: US 11,818,042 B2
(45) Date of Patent: *Nov. 14, 2023

(54) ROUTING TABLE SELECTION BASED ON UTILIZATION

(71) Applicant: Arista Networks, Inc., Santa Clara, CA (US)

(72) Inventors: Dhanashree Nagre, Santa Clara, CA (US); Sriram Sellappa, Santa Clara, CA (US); Rajnish Gupta, Fremont, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/051,740

(22) Filed: Nov. 1, 2022

(65) Prior Publication Data
US 2023/0093144 A1 Mar. 23, 2023

Related U.S. Application Data

(63) Continuation of application No. 16/562,366, filed on Sep. 5, 2019, now Pat. No. 11,522,796.

(51) Int. Cl.
H04L 45/741 (2022.01)
H04L 45/00 (2022.01)
H04L 45/748 (2022.01)

(52) U.S. Cl.
CPC ............ H04L 45/741 (2013.01); H04L 45/20 (2013.01); H04L 45/66 (2013.01); H04L 45/748 (2013.01)

(58) Field of Classification Search
CPC ....... H04L 45/742; H04L 45/20; H04L 45/66; H04L 45/748
USPC ........................................................ 370/351
See application file for complete search history.

(56) References Cited

U.S. PATENT DOCUMENTS

| 6,952,401 | B1 | 10/2005 | Kadambi et al. |
| 7,031,320 | B2 | 4/2006 | Choe |
| 8,059,658 | B1 | 11/2011 | Rovner et al. |
| 9,680,749 | B2 | 6/2017 | Labonte et al. |
| 9,942,149 | B2 | 4/2018 | Labonte et al. |

(Continued)

OTHER PUBLICATIONS

AristaFlexRoute(TM) Engine. Retrieved from: https://www.arista.com/assets/data/pdf/Whitepapers/FlexRoute-WP.pdf; Sep. 2016.

(Continued)

Primary Examiner — Kwang B Yao
Assistant Examiner — Syed M Bokhari
(74) Attorney, Agent, or Firm — Fountainhead Law Group P.C.

(57) ABSTRACT

In some embodiments, a method sets a threshold for utilization of a first table, wherein the utilization is based on layer 3 addresses and layer 2 addresses being stored in the first table. When a utilization of the first table does not meet the threshold, the method stores a layer 3 address in the first table. The first table uses a first type of lookup to determine a next hop address for the layer 3 addresses or the layer 2 addresses, and the first table also stores one or more layer 2 addresses. When the utilization of the first table meets the threshold, the method stores the layer 3 address in a second table where the second table uses a second type of lookup to determine the next hop address for layer 3 addresses.

20 Claims, 8 Drawing Sheets

(56) References Cited

U.S. PATENT DOCUMENTS

| | | |
|---|---|---|
| 9,979,651 B2 | 5/2018 | Labonte et al. |
| 2006/0255043 A1 | 11/2006 | Tedford, Jr. |
| 2014/0244815 A1 | 8/2014 | Bhardwaj |
| 2014/0358886 A1 | 12/2014 | Westlund et al. |
| 2016/0087892 A1* | 3/2016 | Janakiraman ......... H04L 45/745 370/392 |
| 2016/0254999 A1 | 9/2016 | Labonte et al. |
| 2018/0241673 A1 | 8/2018 | Labonte et al. |
| 2019/0104067 A1 | 4/2019 | Ghosh et al. |

OTHER PUBLICATIONS

International Search Report and Written Opinion for International Application No. PCT/US20/49037 dated Jan. 8, 2021, 9 pages.
International Preliminary Report on Patentability, International Application No. PCT/US2020/049037, dated Mar. 8, 2022, 7 pages.
Extended European Search Report dated Feb. 1, 2023, EP application No. 20860525.3.

* cited by examiner

ROUTING TABLE SELECTION BASED ON UTILIZATION

CROSS REFERENCE TO RELATED APPLICATION

This application is a continuation of U.S. application Ser. No. 16/562,366, filed Sep. 5, 2019, the contents of which are incorporated herein by reference for all purposes.

BACKGROUND

Network devices can provide both switching (e.g., layer 2 switching) and routing (e.g., layer 3 routing) functionality. The network devices may use tables to determine a next hop in which to transmit data, such as data that is sent in a packet. For example, the network device may include two types of tables, such as an exact match (EM) table and a longest prefix match (LPM) table.

The exact match table is typically used for programming layer 2 addresses (media access control (MAC) addresses) when the network device is used as a switch. The longest prefix match table is typically used to program layer 3 addresses when a network device is used as a router. For example, each entry in the tables may include an address and a next hop re-write. The address may correspond to the destination of the packet and the next hop re-write may be an address that is the next hop for the packet. As the size of the number of available addresses grows, such as on the Internet, bigger routing tables are required over time. Typically, the hardware of the network devices is upgraded to add additional memory for a larger longest prefix match table or exact match table.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
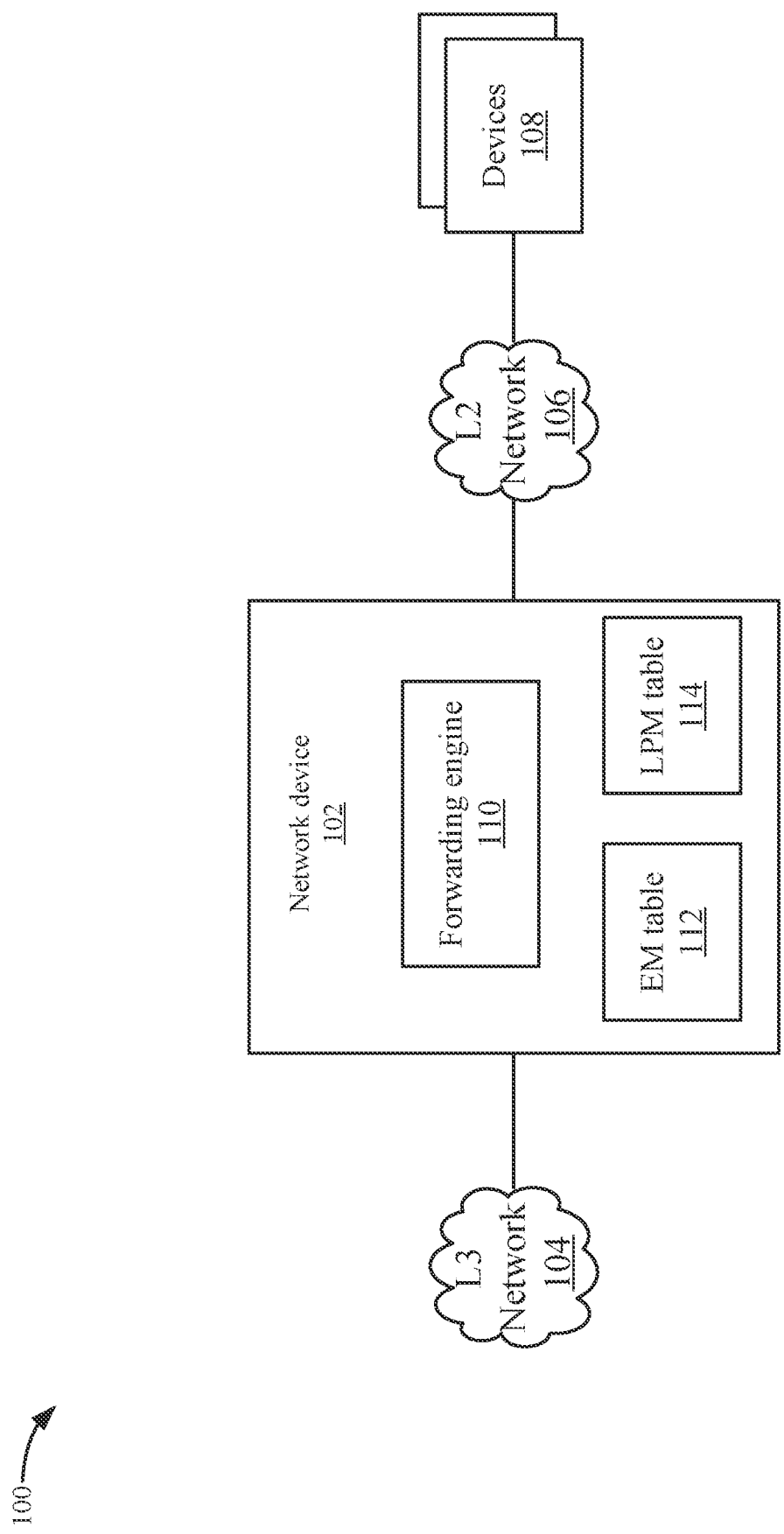
FIG. 1 depicts a simplified system for transmitting packets according to some embodiments.

Described herein are techniques for a network device. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

When a network device is primarily used as a router, the utilization of the exact match table may be low because the primary function of the router is to route packets in a layer 3 network, and not forward packets in a layer 2 network. That is, there may not be many directly-connected devices that are forwarding packets in a layer 2 network using layer 2 addresses (e.g., MAC addresses). To better utilize the exact match table, the network device may use the exact match table to store eligible layer 3 addresses that typically would be stored in the longest prefix match table. The exact match table may have a configuration that specifies the prefix lengths that can be stored in exact match table 112. Eligible layer 3 addresses routes may be layer 3 addresses that have a prefix length that matches the prefix length that are eligible to be stored in the exact match table. Accordingly, using the exact match table to store layer 3 addresses optimizes the amount of storage that the network device can use to store both layer 2 addresses and layer 3 addresses.

In addition to storing layer 3 addresses in the exact match table, the network device may set a high threshold that is based on the utilization of the exact match table. For example, the high threshold may be based on an amount of storage that is being used in the exact match table. When the utilization of the exact match table goes above the high threshold, the network device may perform a first action, such as switching from storing eligible layer 3 addresses in the exact match table to storing these layer 3 addresses in the longest prefix match table. That is, the network device stores newly-received layer 3 addresses in the longest prefix match table when the utilization of the exact match table meets the high threshold.

The network device may also set a low threshold for the exact match table that is based on the utilization of the exact match table. When the low threshold for the exact match table is met, the network device may perform a second action. For example, the second action may include switching the storing of newly received eligible layer 3 addresses in the longest prefix match table back to being stored in the exact match table. Other second actions may include reviewing the routes in the longest prefix match table and the exact match table, and moving routes between the tables, such as moving eligible layer 3 addresses in the longest prefix match table to the exact match table.

The above process may optimize the use of the memory for the exact match table and the longest prefix match table. For example, one table may not be underutilized in the case where the network device stored a small amount of layer 2 addresses in the exact match table when the network device primarily functioned as a router. Also, the above process may not overutilize a table, such as by overflowing the exact match table when storing the layer 3 addresses in the exact match table because the high threshold is used. Further, the review of the routes in the longest prefix match table may be used to balance the use of memory in both the exact match table and the longest prefix match table.

SYSTEM OVERVIEW

FIG. 1 depicts a simplified system 100 for transmitting packets according to some embodiments. A network device 102 may be connected to a layer 3 (L3) network 104 and a layer 2 (L2) network 106. Network device 102 may be located in layer 2 network 106, such as at the edge of layer 2 network 106, but network device 102 may be located in other positions in system 100. Layer 2 network 106 may be connected to devices 108, which may be servers, hosts, or other devices, that are connected in a sub-network. Layer 3 network 104 may be an external network that is external to layer 2 network 106.

Network device 102 may transmit packets to devices via the external networks using layer 3 network 106. In this example, network device 102 operates as a router that routes the packets using layer 3 addresses for the devices. Layer 3 addresses may be Internet Protocol (IP) addresses. Network device 102 may also transmit packets via layer 2 network 106 between devices 108. Layer 2 addresses may be media access control (MAC) addresses. In this example, network device 102 uses layer 2 addresses for devices 108 and operates as a switch.

Network device 102 includes a forwarding engine 110 that processes packets that are transmitted on layer 3 network 104 or layer 2 network 106. Forwarding engine 110 may receive a packet, which includes a source address and a destination address, and then use one of an exact match (EM) table 112 and a longest prefix match (LPM) table 114 to determine a next hop for the packet.

In some embodiments, exact match table 112 and longest prefix match table 114 can include forwarding information. For example, exact match table 112 and longest prefix match table 114 store routing table entries for the one or more routing protocols that are used by forwarding engine 110, by using any of the routing protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), and any/or other type or unicast routing protocol known in the art. In another embodiment, exact match table 112 and longest prefix match table 114 can store routing information for Internet Protocol (IP) v4 and IPv6 addresses. In some embodiments, the forwarding information applies to virtual routing and forwarding (VRF) where the VRF identifier is part of the key being looked up in both the longest prefix match table and the exact match table.

Exact match table 112 and longest prefix match table 114 can be stored in software (e.g., the main memory of network device 102) or can be stored in hardware (e.g., specialized fast-performing hardware data structure such as a ternary content-addressable memory (TCAM), a multi-level trie, or another type of specialized memory). In some embodiments, exact match table 112 is implemented as a hash table in hardware. Longest prefix match table 114 can be implemented in a variety of ways including combinations of TCAM and memory or multi-level hash table).

In some embodiments, entries in exact match table 112 and longest prefix match table 114 may be referred to as address routes, and may include an address or address range (e.g., a subnet) and a next hop. In some embodiments, the next hop is a next step in the route in which a packet is transmitted, such as an interface that is used by the network device 102 to transmit a packet with an address that matches the entry. The interface may be connected to a network. For a given destination address, the network device 102 performs address lookups on the destination address using both exact match table 112 and longest prefix match table 114. Based on these results, network device 102 decides which address lookup result to use. In some embodiments, network device 102 performs these address lookups concurrently.

In some embodiments, exact match table 112 and longest prefix match table 114 may be implemented as a single table or as multiple tables. In some embodiments, exact match table 112 is used to perform exact match address lookups, such as exact match table 112 includes a hash table that is used for exact match address lookup to determine a next hop for a packet. The address routes in exact match table 112 may be programmed as key-value pairs. Forwarding engine 110 looks up an entry in exact match table 112 using a key, and if the key is present, the look-up returns the value associated with the key. For the look-up to be successful, the key that is looked up has to match exactly with the key that was stored in the table. Although exact matches are described, in some embodiments, exact match table 112 can be a different type of table that does not require exact matches. In some embodiments, exact match table 112 is stored in memory that is different from a TCAM. For example, exact match table 112 is stored in memory that is four to eight times cheaper than a TCAM.

In some embodiments, exact match table 112 is used to perform address lookups for matches with specific prefix lengths. An address prefix length is the number of bits set in the mask of the address. Exact match table 112 may have a configuration that specifies certain prefix lengths are stored an address route entries. In some embodiments, network device 102 uses exact match table 112 by looking up a single prefix length but effectively stores different prefix lengths for keys. For example, entries can be stored for 22, 23, and 24 bit prefixes or entries with different length prefixes, but the exact match lookup is done for 23 bit length. In this example, routes with 24 bit prefixes (e.g., /24) can be a common route stored in exact match table 112. To use exact match table 112 for address lookups, network device 102 generates a key of up to N bits of the destination address and uses this key to perform the exact match address lookup. In some embodiments, network device 102 can generate multiple keys from the same destination address and use these keys to perform multiple exact match address lookup for that destination address. These lookups with different prefix lengths could be done in different exact match tables or in the same one provided that the lookup for different prefix lengths were distinguished by a key that is also part of the exact match lookup. For example, if network device 102 is performing both a 23 and 19 bit prefix lookup, the lookup for the 23 bit prefix would be 1'b0 followed by the first 23 bits of the destination IP address then all zeroes afterwards and the lookup for 19 bit address would be 1'b1 followed by the first 19 bits of the destination IP address and then all zeroes. In some embodiments, performing multiple lookups (e.g., using exact match table 112 and longest prefix match table 114) and/or with multiple keys, there is the potential for multiple address lookup results. In some embodiments, forwarding engine 110 determines which lookup results are to be used for the destination address.

In another embodiment, exact match table 112 can store multiple results in a single exact match table entry. If the exact match result is wider than the next hop encoding or if the exact match table lookup is limited to fewer possible next hops, forwarding engine 110 encodes a power of 2 next hops per exact match table lookup. In this embodiment, forwarding engine 110 uses more bits from the destination address lookup to resolve which one of the actual next hops is chosen. For example, if a lookup for a /24 key in exact match table 112 is performed, where an entry is encoded with two nexthops per result, forwarding engine 110 can store two adjacent /25 routes as a single entry in the hash table. forwarding engine 110 then uses bit 25 of the destination address to resolve which of the nexthops to use.

Furthermore, and in some embodiments, forwarding engine 110 can store shorter prefixes using multiple table entries in exact match table 112. Assuming that forwarding engine 110 performs lookups using 24-bit keys (e.g., looking up /24 routes in the hash table), forwarding engine 110 could store prefixes shorter than/24 routes using multiple exact match table 112 entries. For example, a /23 route can be stored in exact match table 112 by inserting 2/24 route entries in exact match table 112 by expanding the shorter /23 prefix into the two /24 prefixes. Similarly, for a /22 route, network device 102 expands the /22 route into 4/24 routes.

As described above, network device 102 also includes longest prefix match table 114. In some embodiments, network device 102 uses longest prefix match table 114 to store entries for a longest prefix match type of address lookup, but other types of lookups may be appreciated. Exact match table 112 and longest prefix match table 114 may have different types of lookups for address routes. Network device 102 may store entries in longest prefix match table 114 as key value pairs. In some embodiments, forwarding engine 110 uses the destination addresses as the key for the address lookup. Forwarding engine 110 looks up an entry in longest prefix match table 114 using the key, and if the key is present, the look-up returns the value associated with the key. It is possible that multiple matches may occur for the key. For example, the prefix used to perform the look-up may be associated with multiple keys in longest prefix match table 114. The look-up selects the key from longest prefix match table 114 that matches the key having the most number of bits (e.g., the most specific key) that match. For example, if one forwarding entry can match 16 bits of an address and another forwarding entry matches 24 bits of an address, forwarding engine 110 uses the second forwarding entry for the longest prefix match as matching 24 bits is longer than matching 16 bits. If the key being looked up does not match any entry at all, a default value may be returned. In some embodiments, longest prefix match table 114 may be a Trie data structure. Also, in some embodiments, longest prefix match table 114 is stored in a TCAM, so that some or all on the entries in longest prefix match table 114 can be searched concurrently.

As described above, the forwarding engine 110 can use two different types of address lookups: an exact match address lookup using a key lookup with exact match table 112 and a longest prefix match address lookup using the address with longest prefix match table 114. In some embodiments, forwarding engine 110 can perform both address lookups concurrently. Forwarding engine 110 determines a next hop for a destination address by performing the exact match address lookup and also performing a longest prefix match address lookup with the destination address. Forwarding engine 110 uses the results of the two address lookups and decides which result to use for the next hop decision. In some embodiments, forwarding engine 110 performs one or both of the address lookups to determine a next hop for the destination address. In some embodiments, forwarding engine 110 performs the two address lookups concurrently by overlapping the time periods in which the two address lookups are performed. In some embodiments, if the exact match address lookup is preferred over the longest prefix match address lookup, forwarding engine 110 may make sure that more specific routes are stored in exact match table 112 and not longest prefix match table 114. In another embodiment, forwarding engine 110 allows putting prefixes in exact match table 112 that have more specific prefixes underneath by encoding in the result of longest prefix match table length of the match and picking the appropriate result from exact match table 112 results or longest prefix match table 114 results based on the presence of hits on exact match table 112 lookups and the longest prefix match table result.

Network device 102 may be used to transmit packets using layer 3 addresses or transmit packets using layer 2 addresses. The entries for transmitting packets using layer 3 addresses may be referred to as layer 3 addresses and the entries for transmitting packets using layer 2 addresses may be referred to as layer 2 addresses. As discussed above, network device 102 may store layer 3 addresses in exact match table 112. To avoid overutilizing exact match table 112, network device 102 may set a threshold, such as a high threshold, for exact match table 112. Using the high threshold, network device 102 may avoid an overflow of entries in exact match table 112. For example, when the memory for exact match table 112 goes over a utilization amount, additional addresses cannot be stored in exact match table 112, and errors may result. Using the high threshold may avoid this situation by detecting when the memory of exact match table 112 reaches a certain utilization. The following will now describe the use of the high threshold according to some embodiments.

Route Storage Using a High Threshold

Figure 2:
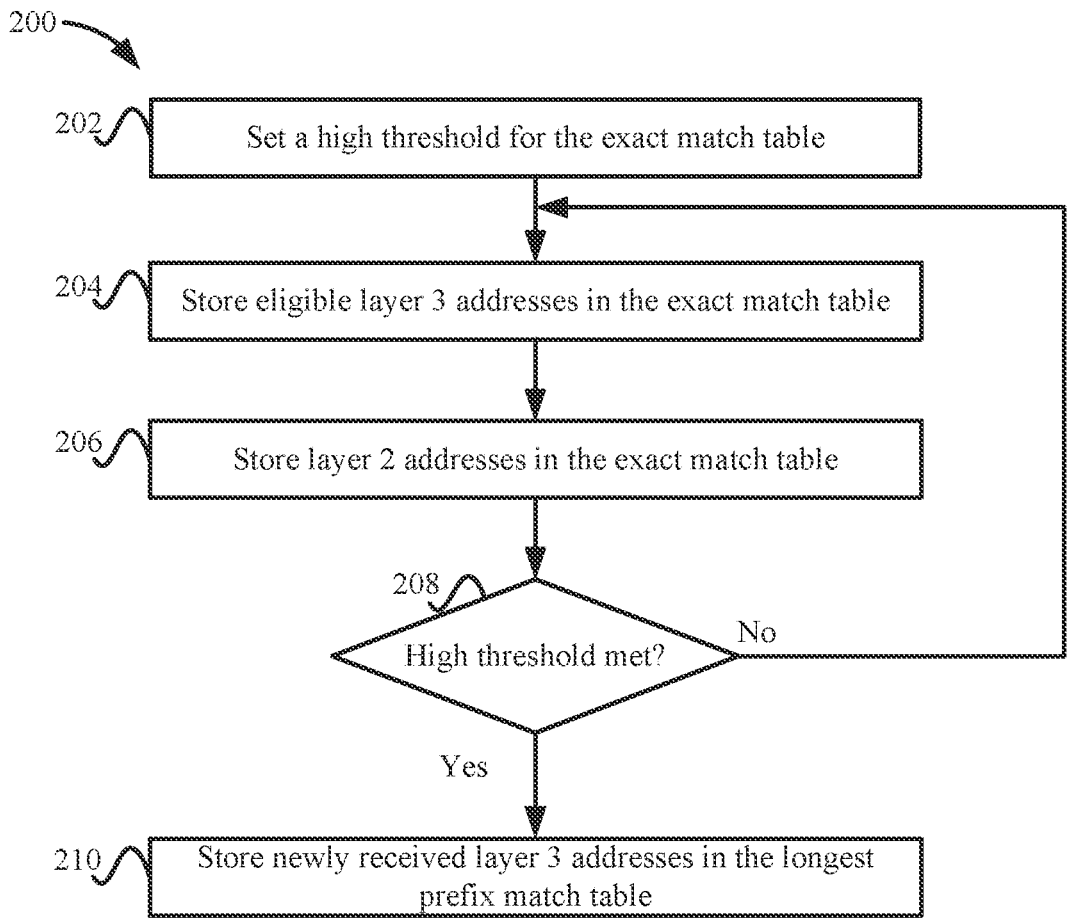
FIG. 2 depicts a simplified flowchart of a method for using a high threshold to store address routes in an exact match table and a longest prefix match table according to some embodiments.

FIG. 2 depicts a simplified flowchart 200 of a method for using a high threshold to store address routes in exact match table 112 and longest prefix match table 114 according to some embodiments. At 202, network device 102 may set a high threshold for exact match table 112. The high threshold may be based on the utilization of memory for exact match table 112. In some embodiments, one example of the high threshold may be a percentage utilization of the allotted memory for exact match table 112, such as 90% memory used, 95% memory used, etc. That is, a 90% threshold means that 90% of the allotted memory for exact match table 112 has been used. In some embodiments, the high threshold may be set such that the memory utilization of exact match table 112 may not be entirely used when the high threshold is reached. For example, even though network device 102 may be mainly used for routing layer 3 addresses, network device 102 may still need to insert layer 2 addresses in exact match table 112. By setting a high threshold that is less than 100%, network device 102 ensures that some memory of exact match table 112 is available for storing layer 2 addresses.

At 204, network device 102 stores eligible layer 3 addresses in exact match table 112. As discussed above, network device 102 may typically store layer 3 addresses in longest prefix match table 114. However, to better utilize the memory of exact match table 112, network device 102 stores layer 3 addresses in exact match table 112. As discussed above, exact match table 112 may have a configuration that specifies which prefix length routes could be stored in exact match table 112, such as the configuration may specify that prefix routes of the length /24 and /28 layer 3 addresses can be stored in exact match table 112. The notation /24 indicates the number of bits in the address. The eligible layer 3 addresses are layer 3 addresses that have the prefix length in the configuration that are set in the configuration of exact match table 112. Network device 102 stores the other layer 3 addresses that do not have the prefix length that are eligible to be stored in exact match table 112 in longest prefix match table 114. In some embodiments, the prefix-lengths can be configured and will be static. Also, network device 102 can map profiles of deployments to prefix lengths that best suit the route distributions that are typical in these deployments. Further, network device 102 can dynamically figure out based on the current route distribution the prefix lengths that should be configured to go to exact match table 112. For example, network device 102 may use the prefix lengths with the highest number of routes to be programmed in exact match table 112. Further, network device 102 can keep changing these prefix lengths as the route distribution changes.

Additionally, if any layer 2 addresses are received, at 206, network device 102 stores the layer 2 addresses in exact match table 112. In some embodiments, all layer 2 addresses are stored in exact match table 112.

At 208, network device 102 determines if the high threshold is met. For example, network device 102 monitors the memory utilization for exact match table 112 and compares the utilization to the high threshold. If the high threshold is not met, then network device 102 continues to store eligible layer 3 addresses and layer 2 addresses in exact match table 112.

If the high threshold is met, at 210, network device 102 performs an action, such as storing newly-received layer 3 addresses in longest prefix match table 114. For example, network device 102 may program forwarding engine 110 to insert newly-received layer 3 addresses in longest prefix match table 114, which may include newly-received layer 3 addresses that have a prefix length that would be eligible to be stored in exact match table 112 if the high threshold was not met.

Route Storage Using a Low Threshold

In addition to setting a high threshold, forwarding engine 110 may set a low threshold. For example, forwarding engine 110 may set a low threshold for exact match table 112 and when the low threshold is met, forwarding engine 110 may perform one or more actions. For example, forwarding engine 110 may evaluate the address routes in longest prefix match table 114 and/or exact match table 112 and determine whether any address routes should be switched between the tables.

Figure 3:
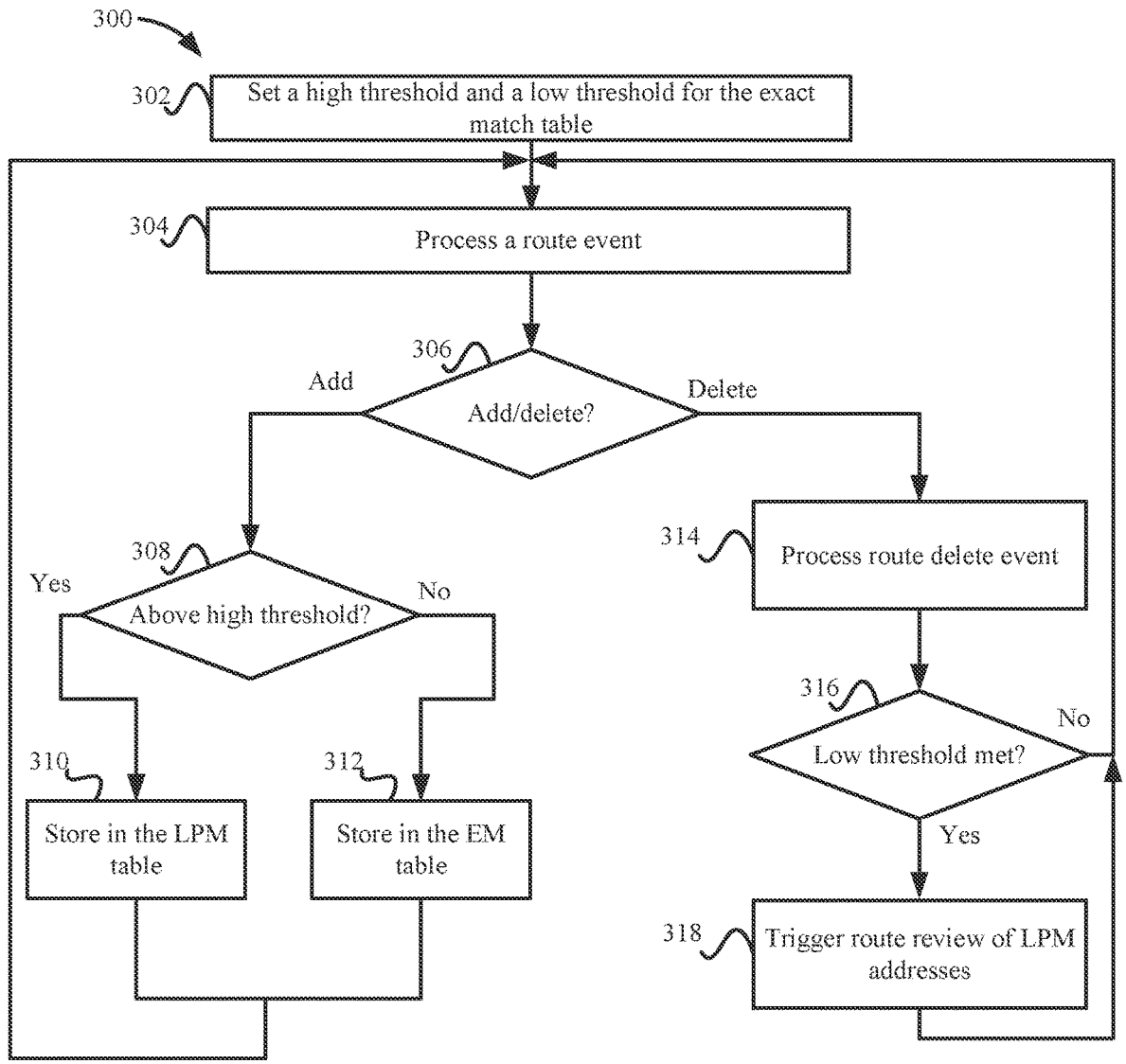
FIG. 3 depicts a simplified flowchart of a method for using multiple thresholds according to some embodiments.

FIG. 3 depicts a simplified flowchart 300 of a method for using multiple thresholds according to some embodiments. At 302, forwarding engine 110 sets a high threshold and a low threshold for exact match table 112. The low threshold may be a value that is less than the high threshold or equal to the high threshold. For example, if the high threshold is a 95% memory utilization, the low threshold may be lower than 95%, such as an 80% memory utilization. In other embodiments, the low threshold may also be the same as the high threshold, such as at 95% (in which case only one threshold may be used).

At 304, forwarding engine 110 processes a route event. The route event may involve adding an eligible layer 3 address into exact match table 112 or deleting an address route from exact match table 112.

At 306, forwarding engine 110 determines if the route event is adding an address route or deleting an address route in exact match table 112. If the route event is adding a layer 3 address, at 308, forwarding engine 110 if the utilization of exact match table 112 meets a high threshold. When a high threshold is met, the memory usage may go above the threshold, equal the threshold, or meet the threshold in other defined ways.

If the utilization is above the high threshold, at 310, forwarding engine 110 stores the layer 3 address in longest prefix match table 114. The utilization of exact match table 112 is above the high threshold, which means there may be limited space in exact match table 112. Thus, forwarding engine 110 stores the layer 3 address in longest prefix match table 114.

If the utilization is not above the high threshold, at 310, forwarding engine 110 stores the eligible layer 3 address in exact match table 112. The utilization of exact match table 112 is below the high threshold, which means there is space in exact match table 112 for layer 3 addresses. Thus, forwarding engine 110 stores the layer 3 address in exact match table 112.

If the route event is deleting a route from exact match table 112, at 314, forwarding engine 110 processes the route delete event, which deletes a route from exact match table 112. The utilization of exact match table 112 goes down at this point, and at 316, forwarding engine 110 determines the utilization of exact match table 112 is meets a low threshold. When a low threshold is met, the memory usage may go below the threshold, equal the threshold, or meet the threshold in other defined ways.

At 318, if the low threshold is met, forwarding engine 110 processes the route delete event, such as forwarding engine 110 evaluates the addresses in longest prefix match table 114. If the low threshold is not met, then forwarding engine 110 continues to process another route event.

Examples of Actions

Figure 4:
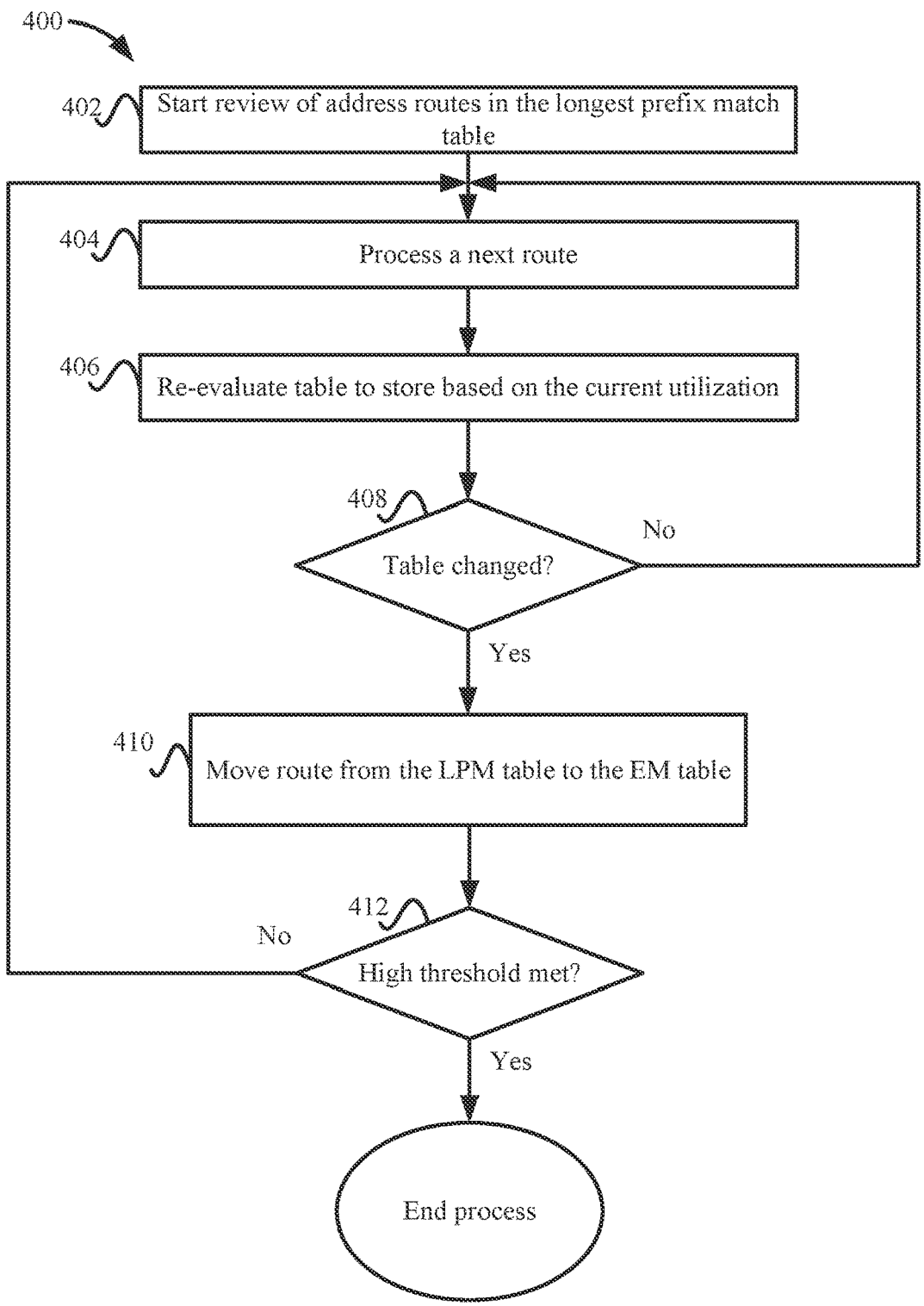
FIG. 4 depicts a simplified flowchart of a method for evaluating the address routes in the longest prefix match table and the exact match table to determine actions to perform according to some embodiments.

As discussed above, forwarding engine 110 may perform different actions when the low threshold is met. FIG. 4 depicts a simplified flowchart 400 of a method for evaluating the address routes in exact match table 112 to determine actions to perform according to some embodiments. The following process may be performed when a low threshold is met. At 402, forwarding engine 110 starts a review of layer 3 addresses in exact match table 112. The review may determine the prefix length of some of the layer 3 addresses in longest prefix match table 114.

At 404, forwarding engine 110 processes a next layer 3 address in longest prefix match table 114. At 406, forwarding engine 110 reevaluates the table to store the layer 3 address based on the current utilization of exact match table 112. For example, forwarding engine 110 may use the utilization to determine whether to switch where layer 3 addresses should be stored.

At 408, forwarding engine 110 determines if a designation of which table a layer 3 address should be changed. If so, at 410, forwarding engine 110 moves the layer 3 address from longest prefix match table 114 to exact match table 112. For example, if the low threshold of exact match table 112 is met (and the percentage utilization of longest prefix match table 114 is below a threshold), forwarding engine 110 may want to move some eligible layer 3 addresses that were being stored in longest prefix match table 114 due to the high threshold being met to exact match table 112. The moving of the addresses may be performed to balance the utilization of exact match table 112 and longest prefix match table 114. For example, forwarding engine 110 may prefer to have all eligible layer 3 addresses stored in exact match table 112 if exact match table 112 is below the high threshold. Forwarding engine 110 may also use other factors, such as the percentage utilization of longest prefix match table 114 (e.g., if there is a lot of memory still available in longest prefix match table 114, then moving address routes may not be necessary). After moving an eligible layer 3 address from longest prefix match table 114 to exact match table 112, at 412, forwarding engine 110 may determine if a high threshold of exact match table 112 is met. If so, the process may end because forwarding engine 110 may not want to continue moving address routes from longest prefix match table 114 to exact match table 112 when the utilization of exact match table 112 meets the high threshold. If the high threshold is not met, then the process reiterates to 404 to process a next route in longest prefix match table 114.

The processing of layer 3 addresses may be different when the high threshold is met. For example, forwarding engine 110 starts to store newly received layer 3 addresses in longest prefix match table 114. However, at some point, forwarding engine 110 may return to storing layer 3 addresses in exact match table 112. In some embodiments, forwarding engine 110 uses a third threshold to determine when the return to storing layer 3 addresses in exact match table 112. The third threshold may be a same value as the low threshold. In other embodiments, the third threshold may be another value, such as a value in between the low threshold and the high threshold. Also, the third threshold may be the same or may be different from the high threshold. For example, if the high and third thresholds are the same, when the memory utilization of exact match table 112 goes above the high threshold, forwarding engine 110 starts storing layer 3 addresses in longest prefix match table 114. Then, when the memory utilization of exact match table 112 goes below the third threshold, network device 102 may start storing eligible layer 3 addresses in exact match table 112.

The third threshold may also be set below the high threshold. For example, the high threshold may be 95% and the third threshold may be lower, such as at 80%. When the high threshold is met, forwarding engine 110 switches from storing the eligible layer 3 addresses in exact match table 112 to longest prefix match table 114, forwarding engine 110 continues to store the eligible layer 3 addresses in longest prefix match table 114 even when the utilization of exact match table 112 goes below the high threshold. When the utilization of exact match table 112 meets the third threshold of 80%, then longest prefix match table 114 may start to store eligible layer 3 addresses in exact match table 112.

By having a third threshold that is lower than the high threshold, forwarding engine 110 avoids having to switch between the tables multiple times. For example, if the utilization of exact match table 112 goes above and below the high threshold in very short periods of time if the third threshold is not set low enough. Also, forwarding engine 110 may move some eligible layer 3 addresses from longest prefix match table 114 to exact match table 112. However, if the third threshold is not set a significant amount below the high threshold, then exact match table 112 may not have room to move eligible layer 3 routes from longest prefix match table 114 to exact match table 112 without increasing the memory utilization to the high threshold or close to the high threshold. Accordingly, by setting a third threshold that is lower than the high threshold, exact match table 112 may have room to store eligible layer 3 addresses that are moved from longest prefix match table 114.

Figure 5:
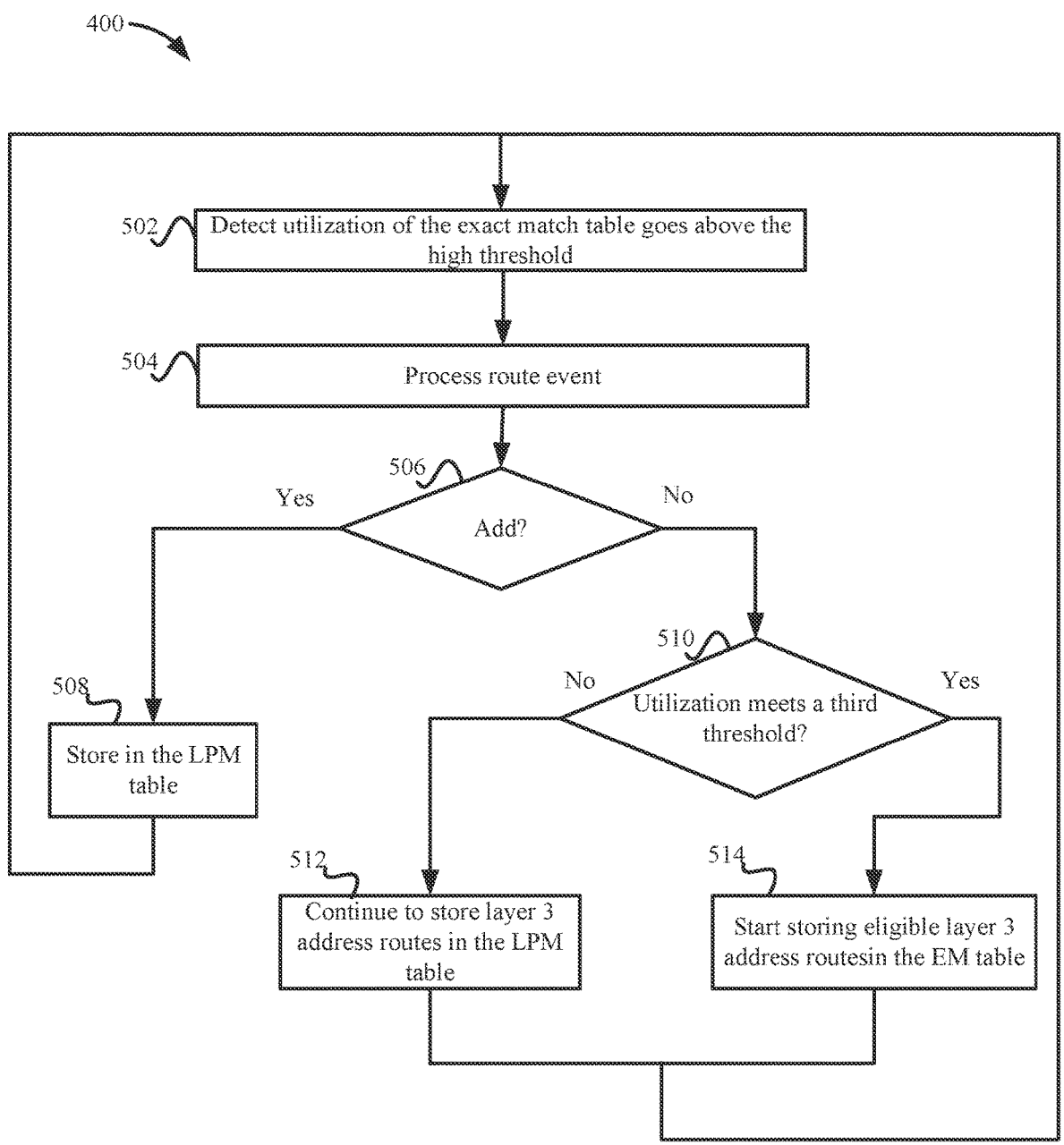
FIG. 5 depicts a method for using a third threshold to determine which table to store layer 3 addresses according to some embodiments.

FIG. 5 depicts a method for using a third threshold to determine which table to store layer 3 addresses according to some embodiments. At 502, forwarding engine 110 detects that utilization of exact match table 112 goes above the high threshold. Thereafter, at 504, forwarding engine 110 processes a route event. At 506, forwarding engine 110 determines if the route event is adding a layer 3 address. If so, at 508, forwarding engine 110 stores the layer 3 address in longest prefix match table 114. Because the utilization of exact match table 112 is not going down because a route is being added, forwarding engine 110 continues to store layer 3 addresses in longest prefix match table 114.

If the route event is deleting a route, at 510, forwarding engine 110 determines if utilization of exact match table 112 meets a third threshold, such as goes below the third threshold. If utilization does not go below the third threshold, at 512, forwarding engine 110 stores the layer 3 address in longest prefix match table 114. If utilization does go below the third threshold, at 514, forwarding engine 110 starts to store the eligible layer 3 addresses in exact match table 112. Accordingly, a deleted address route from exact match table 112 may result forwarding engine 110 returning to storing eligible layer 3 addresses in exact match table 112. This may continue to follow the process described in FIG. 3.

EXAMPLES

Figure 6A:
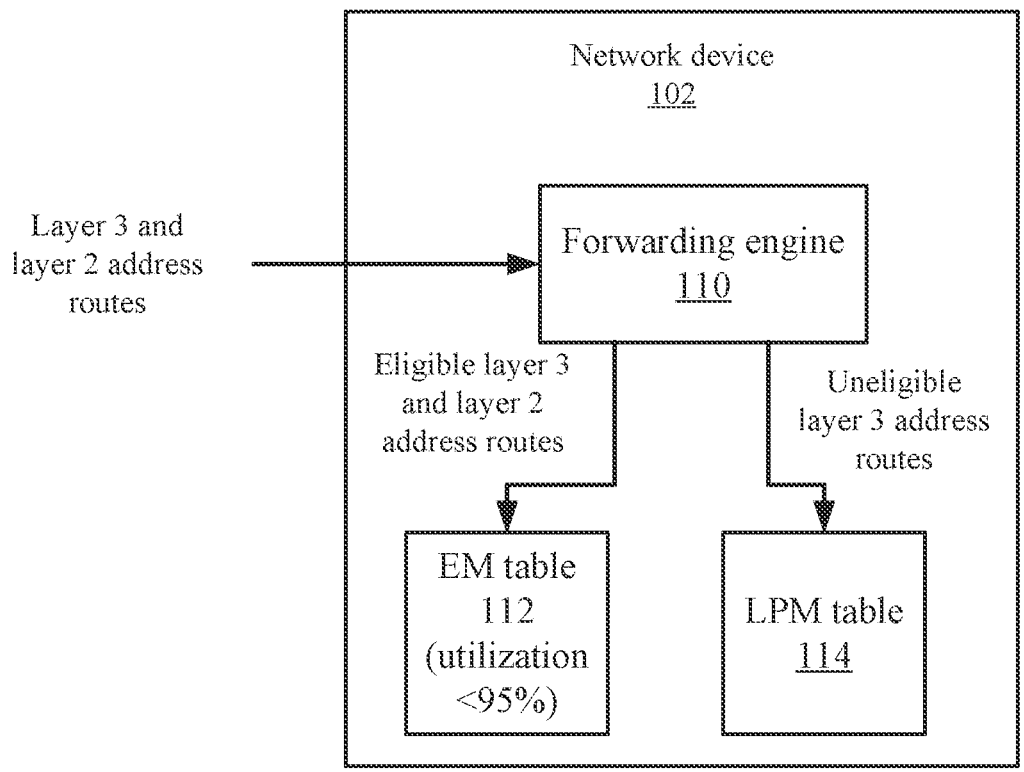
FIG. 6A depicts the processing when the high threshold of exact match table has not been met according to some embodiments.
Figure 6B:
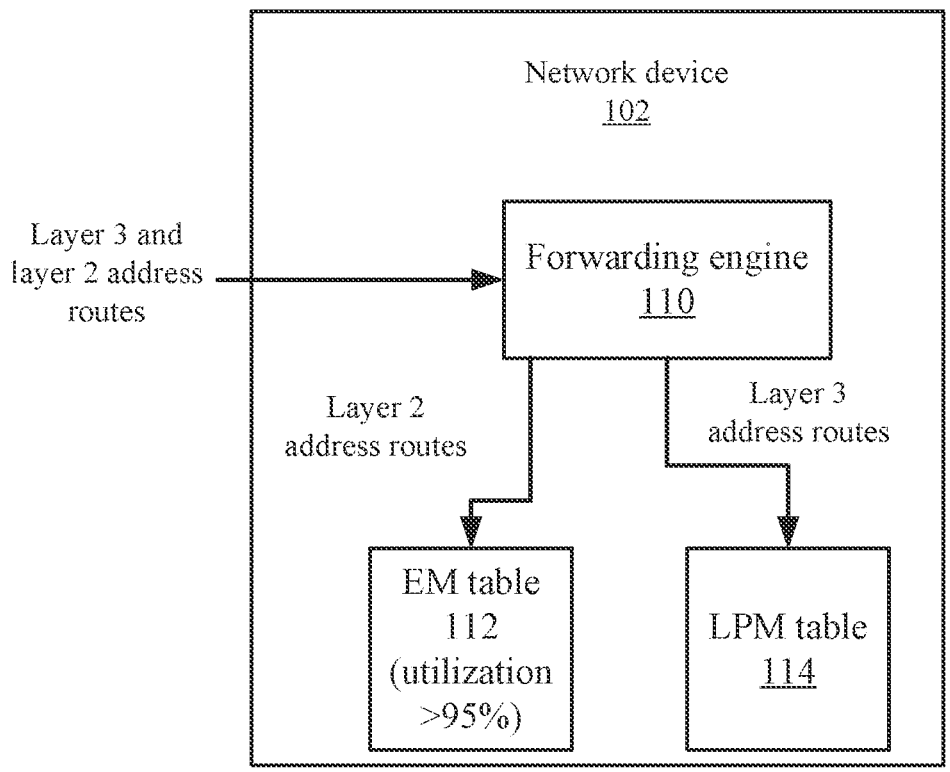
FIG. 6B depicts the processing when the high threshold of the exact match table is met according to some embodiments.

The following shows examples of using the high and third thresholds according to some embodiments; however, other examples may be appreciated. FIGS. 6A and 6B depict the processing using a high threshold according to some embodiments. FIG. 6A depicts the processing when the high threshold of exact match table 112 has not been met according to some embodiments. In FIG. 5, forwarding engine 110 receives layer 3 and layer 2 addresses. Forwarding engine 110 uses exact match table 112 and longest prefix match table 114 to determine a next hop address as discussed above. Also, forwarding engine 110 stores the eligible layer 3 addresses and the layer 2 addresses in exact match table 112. This is when the utilization of exact match table 112 is below the high threshold, such as 95%. Forwarding engine 110 also stores ineligible layer 3 addresses in longest prefix match table 114. The ineligible layer 3 addresses are layer 3 addresses that do not meet the configured prefix lengths for exact match table 112.

FIG. 6B depicts the processing when the high threshold of exact match table 112 is met according to some embodiments. When forwarding engine 110 receives layer 3 and layer 2 addresses, forwarding engine 110 stores the layer 3 addresses in longest prefix match table 114 and not exact match table 112. Also, forwarding engine 110 stores the layer 2 addresses in exact match table 112.

Figure 7A:
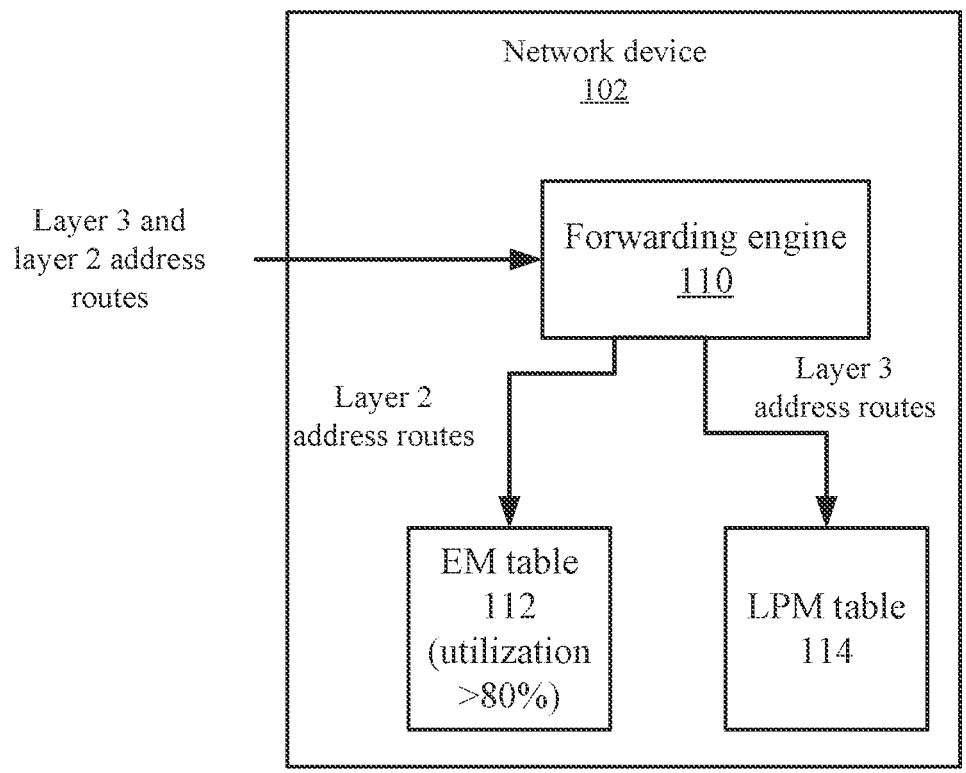
FIG. 7A depicts the processing when the utilization of the exact match table has not met the low threshold according to some embodiments.
Figure 7B:
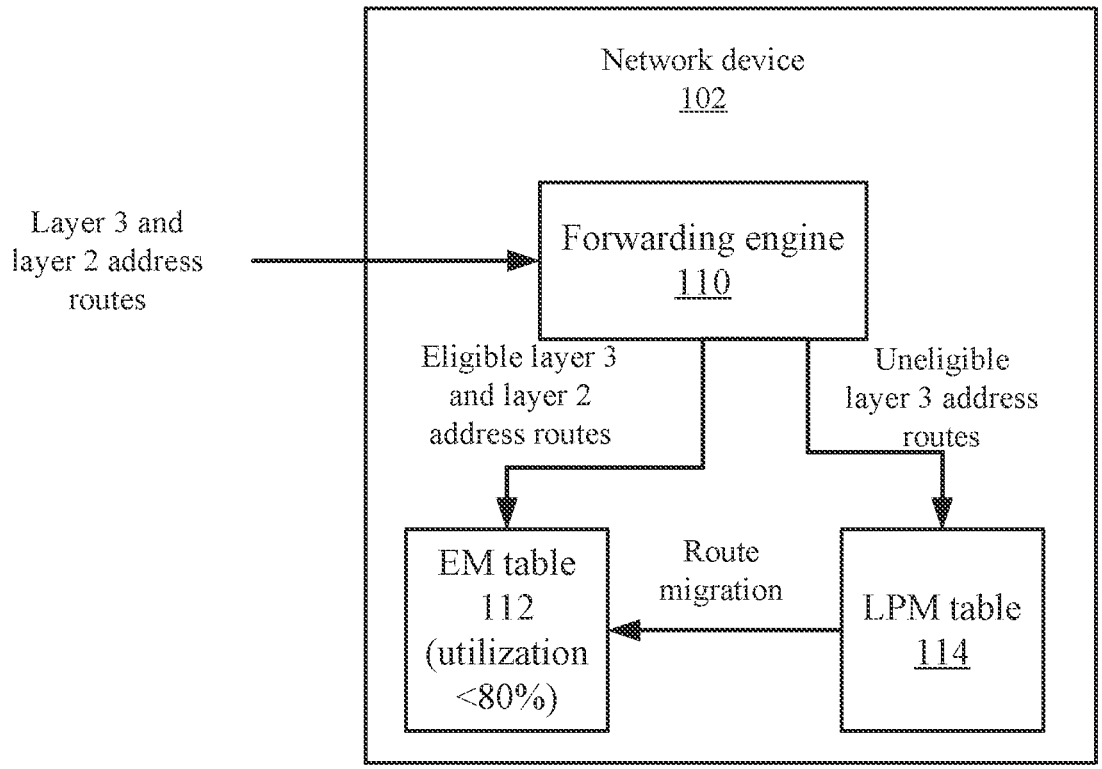
FIG. 7B depicts the processing when the utilization of the exact match table meets the low threshold according to some embodiments.

FIGS. 7A and 7B describe the processing using the third threshold in exact match table 112 according to some embodiments. FIG. 7A depicts the processing when the utilization of exact match table 112 has not met the third threshold according to some embodiments. In this case, the utilization of exact match table 112 has not met the third threshold, such as the utilization is greater than 80%. Processing is the same as described in FIG. 6B where forwarding engine 110 stores layer 2 addresses in exact match table 112 and layer 3 addresses in longest prefix match table 114.

FIG. 7B depicts the processing when the utilization of exact match table 112 meets the third threshold according to some embodiments. In this case, the utilization of exact match table 112 may be less than 80%. In this case, forwarding engine 110 may process layer 3 and layer 2 addresses similarly to the process described in FIG. 6A. That is, forwarding engine 110 switches from storing all layer 3 addresses in longest prefix match table 114 to storing newly received eligible layer 3 addresses in exact match table 112. Also, forwarding engine 110 may perform a route migration by migrating some routes from longest prefix match table 114 to exact match table 112. For example, some eligible layer 3 addresses are moved from longest prefix match table 114 to exact match table 112.

Conclusion

Accordingly, some embodiments optimally utilize exact match table 112 and longest prefix match table 114. Even when network device 102 is used primarily as a router, network device 102 may use exact match table 112 to store layer 3 addresses. Further, when utilization of exact match table 112 meets a high threshold, then forwarding engine 110 may switch to using longest prefix match table 114 to store layer 3 addresses. A further optimization is performed when the memory utilization of exact match table 112 meets a third threshold. Network device 102 can then return to storing eligible layer 3 addresses in exact match table 112. Further, when a low threshold is met, forwarding engine 110 may migrate some eligible layer 3 addresses from longest prefix match table 114 to exact match table 112.

The use of the above process may optimally use the memory for exact match table 112 and longest prefix match table 114. Network device 102 may process a number of layer 3 and layer 2 addresses without having to extend the memory of one of the tables when the other table is not being optimally used.

Embodiments

In some embodiments, a method includes: setting, by a computing device, a threshold for utilization of a first table, wherein the utilization is based on layer 3 addresses and layer 2 addresses being stored in the first table, and wherein the layer 3 addresses and the layer 2 addresses include destination addresses in which a packet is being transmit and next hop addresses that are used to transmit the packet in a next hop; determining, by the computing device, when the utilization of the first table meets the threshold; when the utilization of the first table does not meet the threshold, storing, by the computing device, a layer 3 address in the first table, wherein the first table uses a first type of lookup to determine a next hop address for the layer 3 addresses or the layer 2 addresses, and wherein the first table also stores one or more layer 2 addresses; and when the utilization of the first table meets the threshold, storing, by the computing device, the layer 3 address in a second table, wherein the second table uses a second type of lookup to determine the next hop address for layer 3 addresses.

In some embodiments, the first table uses an exact match table address lookup to determine an exact match of a destination address in the layer 3 address or a destination address in the layer 2 address to determine the next hop address, and the second table uses a longest prefix address lookup to determine a longest prefix that matches the destination address in the layer 3 address or the destination address in the layer 2 address route to determine the next hop address.

In some embodiments, the threshold for the first table comprises a first threshold for the first table, the method further includes: setting a second threshold for the first table, wherein the first threshold is greater than the second threshold; determining when the utilization of the first table meets the second threshold; and when utilization of the first table meets the second threshold, evaluating layer 3 addresses in the second table to determine if any layer 3 addresses stored in the second table should be moved to the first table.

In some embodiments, the method further includes: determining whether to change a table designation for a layer 3 address from the second table to the first table based on the evaluating.

In some embodiments, the method further includes: when the table designation is changed, moving the layer 3 address from the second table to the first table.

In some embodiments, the method further includes: moving the set of layer 3 addresses from the second table to the first table based on the evaluating.

In some embodiments, the threshold for the first table comprises a first threshold for the first table, the method further includes: setting a second threshold for the first table, wherein the first threshold is greater than the second threshold; after meeting the first threshold: determining when the utilization of the first table meets the second threshold; and when utilization of the first table meets the second threshold, storing a layer 3 address in the first table.

In some embodiments, the layer 3 address includes a prefix length that is eligible to be stored in the first table.

In some embodiments, the layer 3 address that is stored in the first table meet a criterion.

In some embodiments, the criterion comprises one or more prefix lengths that are specified for lengths of layer 3 addresses to be stored in the first table.

In some embodiments, the method further includes: when the utilization of the first table meets the threshold, storing newly received layer 3 addresses in the second table.

In some embodiments, when the utilization of the first table meets the threshold, stopping the storing of layer 3 addresses in the first table.

In some embodiments, when the utilization of the first table meets the threshold, continuing to store layer 2 addresses in the first table.

In some embodiments, a non-transitory computer-readable storage medium has stored thereon computer executable instructions, which when executed by a computing device, cause the computing device to be operable for: setting a threshold for utilization of a first table, wherein the utilization is based on layer 3 addresses and layer 2 addresses being stored in the first table, and wherein the layer 3 addresses and the layer 2 addresses include destination addresses in which a packet is being transmit and next hop addresses that are used to transmit the packet in a next hop; determining when the utilization of the first table meets the threshold; when the utilization of the first table does not meet the threshold, storing a layer 3 address in the first table, wherein the first table uses a first type of lookup to determine a next hop address for the layer 3 addresses or the layer 2 addresses, and wherein the first table also stores one or more layer 2 addresses; and when the utilization of the first table meets the threshold, storing the layer 3 address in a second table, wherein the second table uses a second type of lookup to determine the next hop address for layer 3 addresses.

In some embodiments, the first table uses an exact match table address lookup to determine an exact match of a destination address in the layer 3 address or a destination address in the layer 2 address to determine the next hop address, and the second table uses a longest prefix address lookup to determine a longest prefix that matches the destination address in the layer 3 address or the destination address in the layer 2 address to determine the next hop address.

In some embodiments, the threshold for the first table comprises a first threshold for the first table, the method further includes: setting a second threshold for the first table, wherein the first threshold is greater than the second threshold; determining when the utilization of the first table meets the second threshold; and when utilization of the first table meets the second threshold, evaluating layer 3 addresses in the second table to determine if any layer 3 addresses stored in the second table should be moved to the first table.

In some embodiments, the threshold for the first table comprises a first threshold for the first table, the method further includes: setting a second threshold for the first table, wherein the first threshold is greater than the second threshold; after meeting the first threshold: determining when the utilization of the first table meets the second threshold; and when utilization of the first table meets the second threshold, storing a layer 3 address in the first table.

In some embodiments, the layer 3 address includes a prefix length that is eligible to be stored in the first table.

In some embodiments, the layer 3 address that is stored in the first table meet a criterion.

In some embodiments, an apparatus includes: one or more computer processors; and a computer-readable storage medium includes instructions for controlling the one or more computer processors to be operable for: setting a threshold for utilization of a first table, wherein the utilization is based on layer 3 addresses and layer 2 addresses being stored in the first table, and wherein the layer 3 addresses and the layer 2 addresses include destination addresses in which a packet is being transmit and next hop addresses that are used to transmit the packet in a next hop; determining when the utilization of the first table meets the threshold; when the utilization of the first table does not meet the threshold, storing a layer 3 address in the first table, wherein the first table uses a first type of lookup to determine a next hop address for the layer 3 addresses or the layer 2 addresses, and wherein the first table also stores one or more layer 2 addresses; and when the utilization of the first table meets the threshold, storing the layer 3 address in a second table, wherein the second table uses a second type of lookup to determine the next hop address for layer 3 addresses.

System

Figure 8:
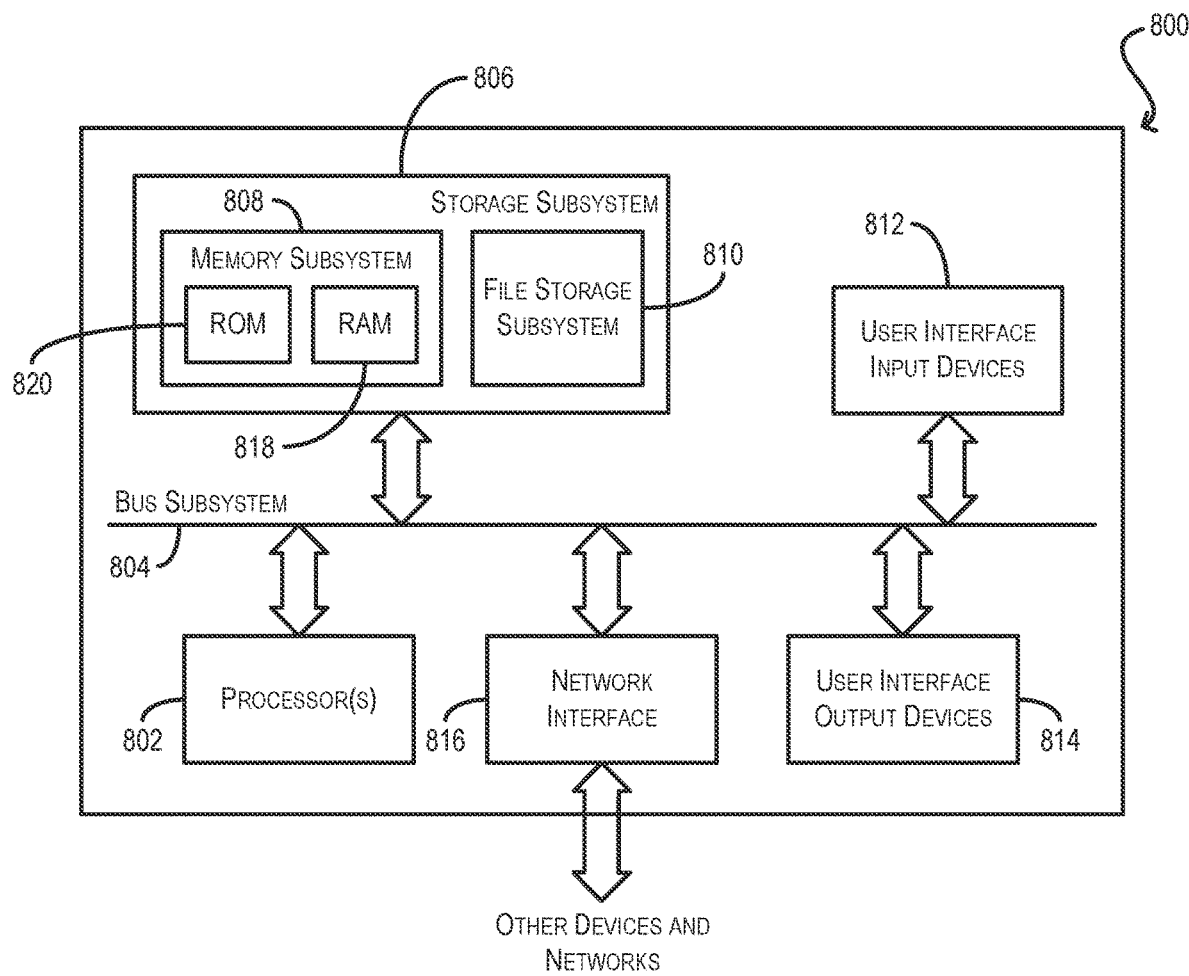
FIG. 8 depicts an example computer system according to some embodiments.

FIG. 8 depicts an example computer system 800 according to some embodiments. Computer system 800 can be used to implement any of the computing devices, systems, or servers described in the foregoing disclosure. As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple buses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims.

Based on the above disclosure and the following claims, other arrangements, embodiments, implementations and equivalents may be employed without departing from the scope hereof as defined by the claims.

What is claimed is:

1. A method comprising:
    determining, by a computing device, whether utilization of a first table meets a threshold for utilization, wherein the utilization is based on usage of memory configured to concurrently store layer 3 addresses and layer 2 addresses in the first table;
    when the utilization of the first table does not meet the threshold, storing, by the computing device, a layer 3 address associated with an incoming packet received by the computing device in the first table; and
    when the utilization of the first table meets the threshold, storing, by the computing device, the layer 3 address associated with the incoming packet in a second table, wherein:
        a first type of lookup is done by the computing device in the first table to determine next hop information for a received packet,
        a second type of lookup is done by the computing device in the second table to determine the next hop information for a received packet, and
        the first table and the second table are included in the computing device.

2. The method of claim 1, wherein:
    the computing device uses an exact match table address lookup in the first table to determine an exact match of the layer 3 address or the layer 2 address to determine the next hop information, and
    the computing device uses a longest prefix address lookup in the second table to determine a longest prefix that matches the layer 3 address to determine the next hop information.

3. The method of claim 1, wherein the threshold for the first table comprises a first threshold for the first table, the method further comprising:
    determining whether the utilization of the first table meets a second threshold for the first table, wherein the first threshold is greater than the second threshold; and
    when utilization of the first table meets the second threshold, evaluating layer 3 addresses in the second table to determine if any layer 3 address stored in the second table should be moved to the first table.

4. The method of claim 3, further comprising determining whether to change a table designation for a layer 3 address from the second table to the first table based on the evaluating.

5. The method of claim 4, further comprising, when the table designation is changed, moving the layer 3 address from the second table to the first table.

6. The method of claim 3, further comprising moving a layer 3 address from the second table to the first table based on the evaluating.

7. The method of claim 1, wherein the threshold for the first table comprises a first threshold for the first table, the method further comprising:
    after meeting the first threshold:
        determining when the utilization of the first table meets a second threshold for the first table, wherein the first threshold is greater than the second threshold; and
        when utilization of the first table meets the second threshold, storing a layer 3 address in the first table.

8. The method of claim 1, wherein the layer 3 address includes a prefix length that is eligible to be stored in the first table.

9. The method of claim 1, wherein the layer 3 address that is stored in the first table meet a criterion.

10. The method of claim 9, wherein the criterion comprises one or more prefix lengths that are specified for lengths of layer 3 addresses to be stored in the first table.

11. The method of claim 1, further comprising, when the utilization of the first table meets the threshold, storing newly received layer 3 addresses in the second table.

12. The method of claim 1, wherein when the utilization of the first table meets the threshold, stopping the storing of layer 3 addresses in the first table.

13. The method of claim 1, wherein when the utilization of the first table meets the threshold, continuing to store layer 2 addresses in the first table.

14. A non-transitory computer-readable storage medium having stored thereon computer executable instructions, which when executed by a computing device, cause the computing device to be operable for:
    determining whether utilization of a first table meets a threshold for utilization, wherein the utilization is based on usage of memory configured to concurrently store layer 3 addresses and layer 2 addresses in the first table;
    when the utilization of the first table does not meet the threshold, storing a layer 3 address associated with an incoming packet received by the computing device in the first table; and
    when the utilization of the first table meets the threshold, storing the layer 3 address associated with the incoming packet in a second table, wherein:
        a first type of lookup is done by the computing device in the first table to determine next hop information for a received packet,
        a second type of lookup is done by the computing device in the second table to determine the next hop information for a received packet, and
        the first table and the second table are included in the computing device.

15. The non-transitory computer-readable storage medium of claim 14, wherein:
    the computing device uses an exact match table address lookup in the first table to determine an exact match of the layer 3 address or the layer 2 address to determine the next hop information, and
    the computing device uses a longest prefix address lookup in the second table to determine a longest prefix that matches the layer 3 address to determine the next hop information.

16. The non-transitory computer-readable storage medium of claim 14, wherein the threshold for the first table comprises a first threshold for the first table, further operable for:
    determining whether the utilization of the first table meets a second threshold for the first table, wherein the first threshold is greater than the second threshold; and
    when utilization of the first table meets the second threshold, evaluating layer 3 addresses in the second table to determine if any layer 3 address stored in the second table should be moved to the first table.

17. The non-transitory computer-readable storage medium of claim 14, wherein the threshold for the first table comprises a first threshold for the first table, further operable for:
    after meeting the first threshold:
        determining when the utilization of the first table meets a second threshold for the first table, wherein the first threshold is greater than the second threshold; and when utilization of the first table meets the second threshold, storing a layer 3 address in the first table.

18. The non-transitory computer-readable storage medium of claim 14, wherein the layer 3 address includes a prefix length that is eligible to be stored in the first table.

19. The non-transitory computer-readable storage medium of claim 14, wherein the layer 3 address that is stored in the first table meet a criterion.

20. An apparatus comprising:
a first table;
a second table;
one or more computer processors; and
a computer-readable storage medium comprising instructions for controlling the one or more computer processors to be operable for:
determining whether utilization of the first table meets a threshold for utilization, wherein the utilization is based on usage of memory configured to concurrently store layer 3 addresses and layer 2 addresses in the first table;
when the utilization of the first table does not meet the threshold, storing a layer 3 address associated with an incoming packet received by the apparatus in the first table; and
when the utilization of the first table meets the threshold, storing the layer 3 address associated with the incoming packet in the second table, wherein:
a first type of lookup is done by the apparatus in the first table to determine next hop information for a received packet, and
a second type of lookup is done by the apparatus in the second table to determine the next hop information for a received packet.

* * * * *